United States Patent
Behrbaum et al.

(10) Patent No.: US 6,326,973 B1
(45) Date of Patent: Dec. 4, 2001

(54) METHOD AND SYSTEM FOR ALLOCATING AGP/GART MEMORY FROM THE LOCAL AGP MEMORY CONTROLLER IN A HIGHLY PARALLEL SYSTEM ARCHITECTURE (HPSA)

(75) Inventors: Todd S. Behrbaum, Issaquah, WA (US); Ronald T. Horan, Houston, TX (US); Stephen R. Johnson, Jr., Redmond, WA (US); John E. Theisen, Conroe, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/206,677

(22) Filed: Dec. 7, 1998

(51) Int. Cl.[7] ........................................................ G09G 5/39
(52) U.S. Cl. ............................. 345/532; 345/520; 345/543
(58) Field of Search ..................................... 345/532, 531, 345/536, 543, 520, 564, 501; 711/100, 104, 105, 5, 703

(56) References Cited

U.S. PATENT DOCUMENTS

| | | | |
|---|---|---|---|
| 5,911,051 | * | 6/1999 | Carson et al. ........................ 710/107 |
| 5,920,881 | * | 7/1999 | Porterfield .............................. 711/2 |
| 5,999,198 | * | 12/1999 | Horan et al. .......................... 345/521 |
| 6,055,643 | * | 4/2000 | Chaiken ................................ 713/323 |
| 6,105,142 | * | 8/2000 | Goff et al. ............................ 713/324 |
| 6,157,398 | * | 12/2000 | Jeddeloh .............................. 345/521 |
| 6,195,734 | * | 2/2001 | Porterfield ............................ 711/203 |

* cited by examiner

Primary Examiner—Kee M. Tung
(74) Attorney, Agent, or Firm—Conley, Rose & Tayon, P.C.

(57) ABSTRACT

A computer system having a highly parallel system architecture with multiple central processing units, multiple core logic chipsets and pooled system memory is provided with one or more AGP ports capable of connection to AGP devices. A memory manager is provided within the operating system for allocating pooled memory resources without regard to the location of that memory. A method is presented for dynamically allocating memory for the AGP device that is located on the same core logic chipset to which the AGP device is connected. By allocating local memory instead of allocating memory on remote core logic units, the AGP device can access the needed memory quickly without memory transmissions along the host bus, thereby increasing overall performance of the computer system.

19 Claims, 7 Drawing Sheets

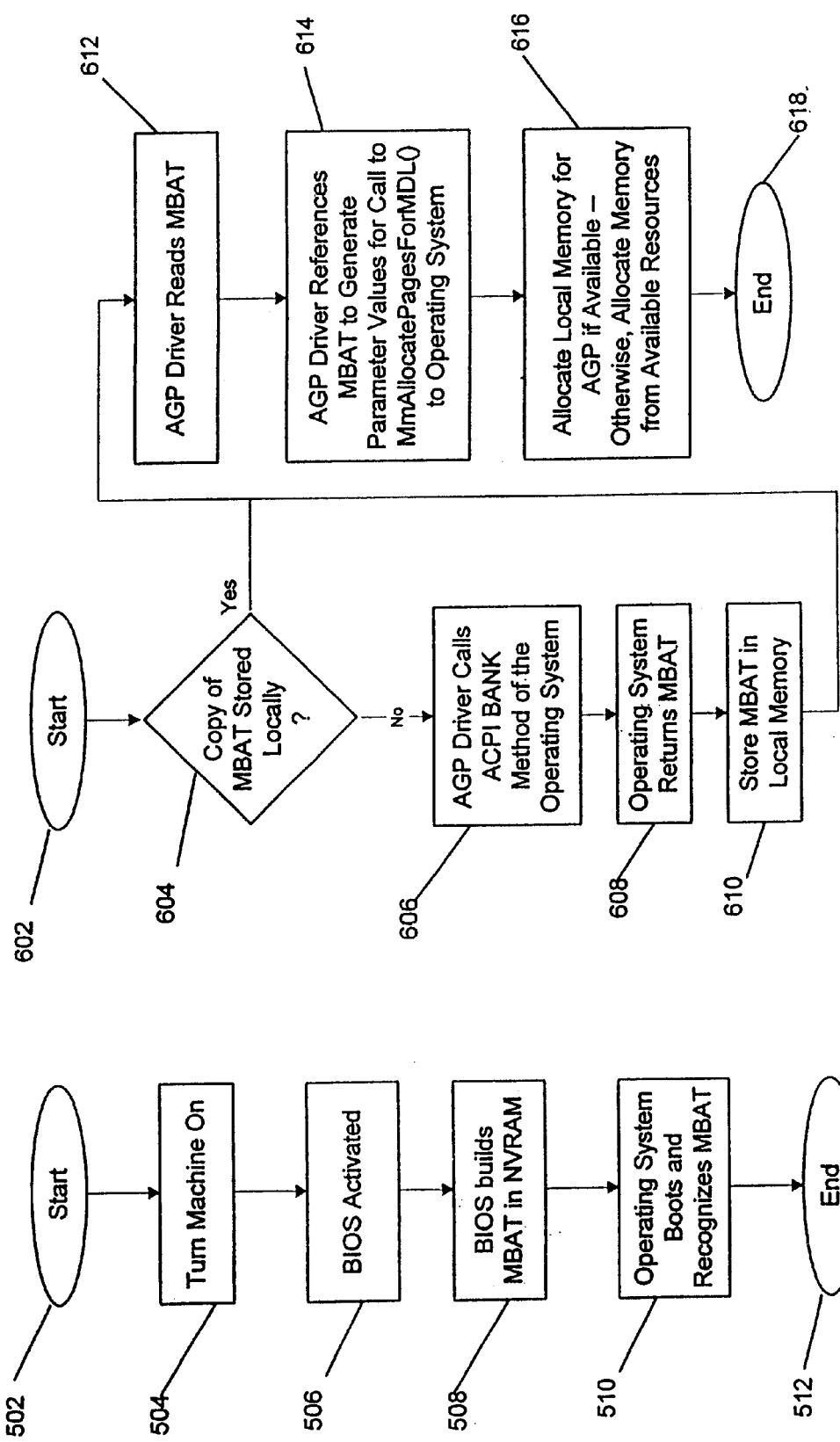

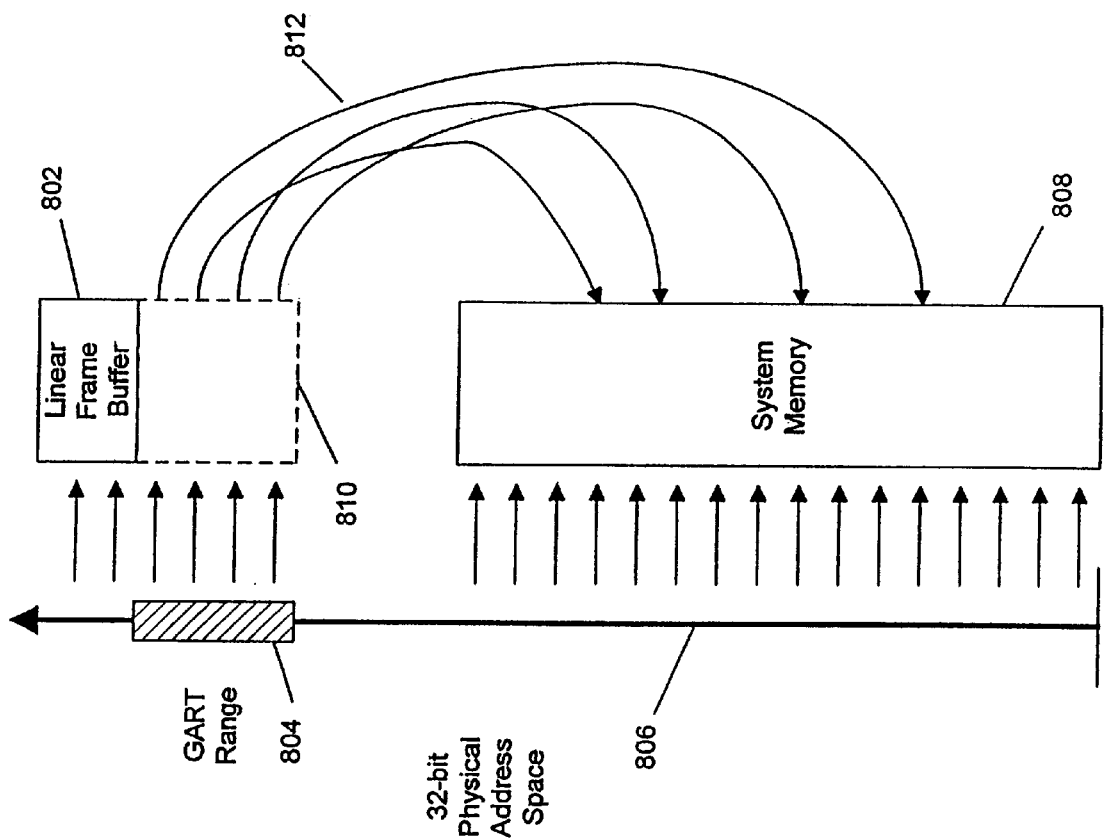

METHOD AND SYSTEM FOR ALLOCATING AGP/GART MEMORY FROM THE LOCAL AGP MEMORY CONTROLLER IN A HIGHLY PARALLEL SYSTEM ARCHITECTURE (HPSA)

CROSS REFERENCE TO RELATED APPLICATION

This patent application is related to commonly owned U.S. patent applications Ser. No. 08/926,422, filed on Sep. 9, 1997, entitled "SYSTEM AND METHOD FOR DYNAMICALLY ALOCATING ACCELERATED GRAPHICS PORT MEMORY SPACE" by Ronald T. Horan, Phillip M. Jones, Gregory N. Santos, Robert Allan Lester, and Robert C. Elliott; and Ser. No. 08/925,722, filed on Sep. 9, 1997, entitled "GRAPHICS ADDRESS REAPPOINT TABLE ENTRY FEATURE FLAGS FOR CUSTOMIZING THE OPERATION OF MEMORY PAGES WITH AN ACCELERATED GRAPHICS PORT DEVICE" by Ronald T. Horan, Phillip M. Jones, Gregory N. Santos, Robert Allan Lester, and Robert C. Elliott, and are hereby incorporated by reference for all purposes.

BACKGROUND OF THE INVENTION

1. Field of the Invention

The present invention relates to computer systems using at least one accelerated graphics port (AGP) with at least two core logic chip sets, and more particularly, in allocating AGP/GART memory from the system memory local to the AGP device.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be stand-alone workstations (high-end individual personal computers), desktop personal computers, portable laptop computers and the like. Moreover, personal computers may be linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, white boarding, integrated enterprise calendar, virtual engineering design and the like. Multiple network servers may also be interconnected by local area networks ("LAN") and wide area networks ("WAN").

A significant part of the ever-increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system's microprocessor central processing unit ("CPU"). The peripheral devices' data transfer speeds are achieved by connecting the peripheral devices to the microprocessor(s) and associated system random access memory through high-speed expansion local buses. Most notably, a high speed expansion local bus standard has emerged that is microprocessor independent and has been embraced by a significant number of peripheral hardware manufacturers and software programmers. This high-speed expansion bus standard is called the "Peripheral Component Interconnect" or "PCI." A more complete definition of the PCI local bus may be found in the following specifications: PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. These PCI specifications and ECN's are available from the PCI Special Interest Group, P.O. Box 14070, Portland, Oreg. 97214.

A computer system has a plurality of information (data and address) busses. These busses include a host bus, a memory bus, at least one high-speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to a memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced Micro Devices, Cyrix, IBM, Digital Equipment Corp., and Motorola also manufacture advanced microprocessors.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever-larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The Intel AGP 3-D graphics standard defines a high-speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification, which provides signal, protocol, electrical, and mechanical specifications for the AGP bus and devices attached thereto. The original specification is entitled "Accelerated Graphics Port Interface Specification Revision 1.0," dated Jul. 31, 1996, the disclosure of which is hereby incorporated by reference. The newest specification is entitled "Preliminary Draft of Accelerated Graphics Port Interface Specification, Preliminary Draft of Revision 2.0," dated Dec. 10, 1997. These AGP Specifications are available from Intel Corporation, Santa Clara, Calif.

The AGP interface specification uses the 66 MHz PCI (Revision 2.1) specification as an operational baseline, with three performance enhancements to the PCI specification which are used to optimize the AGP Specification for high performance 3-D graphics applications. These enhancements are: 1) pipelined memory read and write operations, 2) demultiplexing of address and data on the AGP bus by use of side-band signals, and 3) data transfer rates of 133 MHz for data throughput in excess of 500 megabytes per second ("MB/s"). The remaining AGP Specification does not modify the PCI specification, but rather provides a range of graphics-oriented performance enhancements for use by 3-D graphics hardware and software designers. The AGP Specification is neither meant to replace or diminish full use of the PCI standard in the computer system. The AGP Specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP Specification. Moreover, new Read Only Memory Basic Input Output System ("ROM BIOS") and Application Programming Interface ("API") software are required to make the AGP dependent hardware functional in the computer system. The computer system core logic must still meet the PCI standards referenced above and facilitate interfacing the PCI bus(es) to the remainder of the computer system. In addition, new AGP compatible device cards must be designed to properly interface, mechanically and electrically, with the AGP bus connector.

AGP and PCI device cards are neither physically nor electrically interchangeable even though there is some commonality of signal functions between the AGP and PCI interface specifications. The present AGP Specification only makes allowance for a single AGP device on an AGP bus, whereas, the PCI specification allows two plug-in slots for PCI devices plus a bridge on a PCI bus running at 66 MHz. The single AGP device is capable of functioning in both a 1× mode (264 MB/s peak) and a 2× mode (532 MB/s peak). The AGP bus is defined as a 32-bit bus, and may have up to four bytes of data transferred per clock in the 1× mode and up to eight bytes of data per clock in the 2× mode. The PCI bus is defined as either a 32 bit or 64 bit bus, and may have up to four or eight bytes of data transferred per clock, respectively. The AGP bus, however, has additional side-band signals which enables it to transfer blocks of data more efficiently than is possible using a PCI bus. An AGP bus running in the 2× mode provides sufficient video data throughput (532 MB/s peak) to allow increasingly complex 3-D graphics applications to run on personal computers.

A major performance/cost enhancement using AGP in a computer system is accomplished by shifting texture data structures from local graphics memory to main memory. Textures are ideally suited for this shift for several reasons. Textures are generally read-only, and therefore problems of access ordering and coherency are less likely to occur. Shifting of textures serves to balance the bandwidth load between system memory and the local graphics memory because a well-cached host processor has much lower memory bandwidth requirements than does a 3-D rendering machine. Texture access comprises perhaps the single largest component of rendering memory bandwidth, so avoiding loading or caching textures in local graphics memory saves not only this component of local memory bandwidth, but also the bandwidth necessary to load the texture store in the first place. Furthermore, texture data must pass through main memory anyway as it is loaded from a mass store device. Texture size is dependent upon application quality rather than on display resolution, and therefore may require the greatest increase in memory as software applications become more advanced. Texture data is not persistent and may reside in the computer system memory only for the duration of the software application. Consequently, any system memory spent on texture storage can be returned to the free memory heap when the application concludes (unlike a graphic controller's local frame buffer, which may remain in persistent use). For these reasons, shifting texture data from local graphics memory to main memory significantly reduces computer system costs when implementing 3-D graphics.

Generally, in computer system memory architecture, the graphics controller's physical address space resides above the top of system memory. The graphics controller uses this physical address space to access its local memory, which holds information that is required to generate a graphics screen. In the AGP system, information still resides in the graphics controller's local memory (textures, alpha, z-buffer, etc.), but some data which previously resided in this local memory is moved to system memory (primarily textures, but also command lists, etc.). The address space employed by the graphics controller to access these textures becomes virtual, meaning that the physical memory corresponding to this address space doesn't actually exist above the top of the memory space. In reality, each of these virtual addresses corresponds to a physical address in system memory. The graphics controller sees this virtual address space, referenced hereinafter as "AGP device address space," as one contiguous block of memory, but the corresponding physical memory addresses may be allocated in 4 kilobyte ("KB"), non-contiguous pages throughout the computer system physical memory.

There are two primary AGP usage models for 3D rendering that have to do with how data are partitioned and accessed, and the resultant interface data flow characteristics. In the "DMA" model, the primary graphics memory is a local memory referred to as 'local frame buffer' and is associated with the AGP graphics controller or "video accelerator." 3D structures are stored in system memory, but are not used (or "executed") directly from this memory; rather they are copied to primary (local) memory, to which the rendering engine's address generator (of the AGP graphics controller) makes references thereto. This implies that the traffic on the AGP bus tends to be long, sequential transfers, serving the purpose of bulk data transport from system memory to primary graphics (local) memory. This sort of access model is amenable to a linked list of physical addresses provided by software (similar to operation of a disk or network I/O device), and is generally not sensitive to a non-contiguous view of the memory space.

In the "execute" model, the video accelerator uses both the local memory and the system memory as primary graphics memory. From the accelerator's perspective, the two memory systems are logically equivalent; any data structure may be allocated in either memory, with performance optimization as the only criteria for selection. In general, structures in system memory space are not copied into the local memory prior to use by the video accelerator, but are "executed" in place. This implies that the traffic on the AGP bus tends to be short, random accesses, which are not amenable to an access model based on software resolved lists of physical addresses. Since the accelerator generates direct references into system memory, a contiguous view of that space is essential. But, since system memory is dynamically allocated in, for example, random 4,096 byte blocks of the memory, hereinafter 4-kilobyte ("KB") pages, it is necessary in the "execute" model to provide an address mapping mechanism that maps the random 4 KB pages into a single contiguous address space.

The AGP Specification supports both the "DMA" and "execute" models. However, since a primary motivation of the AGP is to reduce growth pressure on the graphics controller's local memory (including local frame buffer memory), the "execute" model is preferred. Consistent with this preference, the AGP Specification requires a virtual-to-physical address re-mapping mechanism, which ensures the graphics accelerator (AGP master) will have a contiguous view of graphics data structures dynamically allocated in the system memory. This address re-mapping applies only to a single, programmable range of the system physical address space and is common to all system agents. Addresses falling in this range are re-mapped to non-contiguous pages of physical system memory. All addresses not in this range are passed through without modification, and map directly to main system memory, or to device specific ranges, such as a PCI device's physical memory. Re-mapping is accomplished via a "Graphics Address Remapping Table" ("GART") which is set up and maintained by a GART miniport driver software, and used by the core logic chipset to perform the re-mapping. In order to avoid compatibility issues and allow future implementation flexibility, this mechanism is specified at a software (API) level. In other words, the actual GART format may be abstracted to the API by a hardware abstraction layer ("HAL") or mini-port driver that is provided with the core logic chipset. While this API does not constrain the future partitioning of re-mapping hardware, the re-mapping function will typically be implemented in the core logic chipset.

The contiguous AGP graphics controller's device addresses are mapped (translated) into corresponding physical addresses that reside in the computer system physical memory by using the GART which may also reside in physical memory. The GART is used by the core logic chipset to re-map AGP device addresses that can originate from either the AGP, host, or PCI buses. A software program called a "GART miniport driver" manages the GART. The GART miniport driver provides GART services for the computer software operating system.

The size of AGP device address space is always greater than or equal to the amount of physical system memory allocated to AGP. The amount of physical memory allocated to AGP is managed by the computer operating system. AGP device address space is specific to the core logic chipset. In the Compaq/RCC chipset, the AGP device address space may be from a minimum of 32 MB to a maximum of 2 GB, with a default value of, for example, 256 MB. In the Intel 440 BX chipset, the minimum is 4 MB and the maximum is 256 MB. Some AGP graphics controllers do not require the default value of 256 MB of device address space, and may only need the minimum of 32 MB.

AGP memory issues are complicated greatly in computer systems that utilize multiple central processing units and multiple core logic chipsets to facilitate parallel processing. These memory issues are compounded if there are multiple AGP busses present in the computer system. For example, AGP or GART physical system memory can be allocated to memory residing on the non-AGP memory controller controlled through another chipset. Although these addresses can be passed between controllers, doing so consumes both valuable bandwidth and time.

What is needed is a system and method of dynamically allocating virtual address space for an AGP device in a multi-processor/multi-core logic computer system without having to allocate memory in a portion of the computer system that would minimize communications between different memory controllers on separate core logic units.

SUMMARY OF THE INVENTION

The present invention solves the problems inherent in the prior art systems by providing an advanced configuration and power interface (ACPI) control method. ACPI is an operating-system-based specification that defines a flexible and abstract hardware interface for desktop and notebook PCs. As such, the specification enables system designers to integrate power management throughout the hardware components, the operating system, and the software applications. ACPI is utilized in both the Windows NT™ and the Windows 98™ operating systems, available from the Microsoft Corporation of Redmond, Wash. The method of the present invention calls for creating a new ACPI table called the Memory Bank Address Table (MBAT). System BIOS utilizes ACPI Source Language (ASL) to build the MBAT dynamically at startup. The AGP driver and the GART miniport driver access the MBAT via an ACPI control method. The AGP driver and the GART miniport driver uses the MBAT information when making calls to the operating system's memory manager to allocate new memory. For example, the drivers pass ranges derived from MBAT information to the memory manager when the Windows NT 5.0™ operating system service routine "MmAllocatePagesForMdl( )" is called. The memory manager attempts to allocate local memory within the specified range. If local memory cannot be allocated within the required range, the drivers allocate memory from outside the range as a fall back. Once the memory is allocated, the AGP driver and the GART miniport driver access the allocated memory in the normal manner. If local memory is allocated, then the AGP device can utilize this memory without the need of the host bus, thereby eliminating the host bus-related latencies as well as conserving host bus bandwidth.

The MBAT is built before the need for memory allocation arises. In the preferred embodiment of the present invention, the MBAT is built dynamically by the system BIOS as needed. However, if the system configuration never changes, the MBAT may be built once at system startup and simply stored until needed. If the system BIOS does not support the building of the MBAT, the GART miniport driver can build the MBAT. The structure of the MBAT contains the ranges of memory local to the AGP device depending upon the configuration of the computer system found during startup (POST). The actual form of the MBAT is chipset specific because of the use of certain registers. In any case, by the time that the operating system has booted, the MBAT will have been created and the operating system, specifically the memory manager of the operating system, will know of the location of the MBAT. The location of the MBAT can be in system memory, in non-volatile RAM (NVRAM), on a hard disk drive, a network drive that is connected to the computer system via a network interface card, or on any volatile or non-volatile memory that can be connected to the computer system which can contain the contents of the MBAT.

In operation, when the GART miniport driver or the AGP driver need to allocate memory, they reference the MBAT first. In some cases, such as when the MBAT resides on non-local system memory, the AGP driver will receive a copy of the MBAT for future reference. Referencing the copy of the MBAT locally by the AGP driver further reduces demands upon the host bus of the computer system. Once the MBAT has been referenced, either the AGP driver or the GART miniport driver will use the ranges of the system memory that reside on the same core logic chipset as the AGP bus. It is these ranges that are used to allocate memory for the AGP driver or GART miniport driver. If the range of local memory is unavailable (i.e., it has already been allocated for other devices), then the AGP driver or GART miniport driver request memory from any available resources as a fall back.

Other and further features and advantages will be apparent from the following description of presently preferred embodiments of the invention, given for the purpose of disclosure and taken in conjunction with the accompanying drawings.

BRIEF DESCRIPTION OF THE DRAWINGS

FIG. 5 is a flowchart of the building of the MBAT of the present invention;

FIG. 6 is a flowchart of the allocation of memory according to the present invention;

FIG. 8 is a schematic diagram of memory allocation according to the AGP specification.

DETAILED DESCRIPTION OF THE PREFERRED EMBODIMENTS

Figure 1:
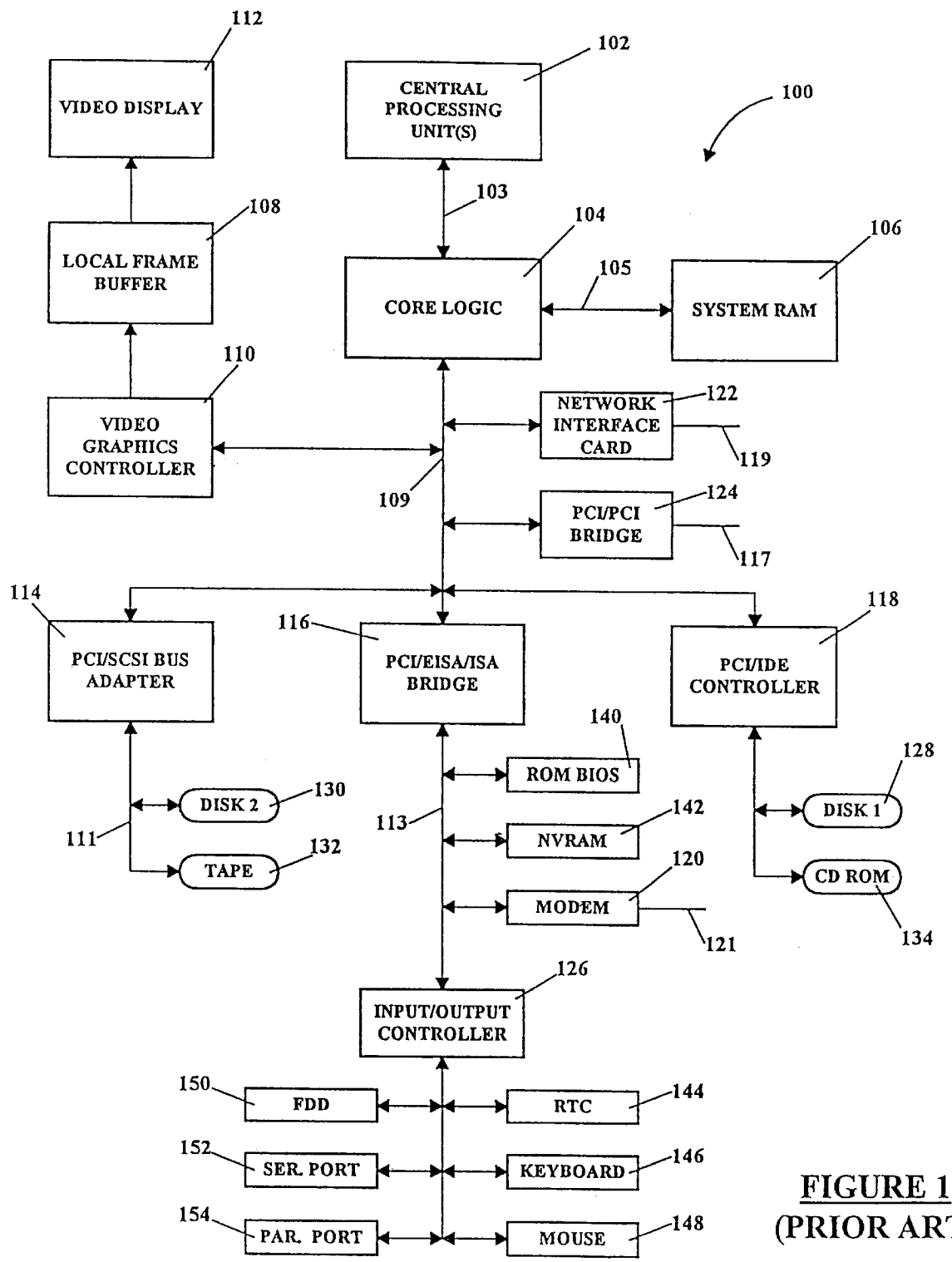
FIG. 1 is a schematic block diagram of a prior art computer system.

The present invention is an apparatus, method and system for allocating AGP/GART local memory whenever possible from the local memory controller to which the AGP device is connected.

The present invention provides a core logic chipset in a computer system which is capable of implementing a bridge between host processor and memory buses, an AGP bus adapted for an AGP device(s), and a PCI bus adapted for PCI devices. The AGP device may be a graphics controller which utilizes graphical data, such as textures, by addressing a contiguous virtual address space, hereinafter "AGP device address space," that is translated from non-contiguous memory pages located in the computer system physical memory by the core logic chipset. The core logic chipset utilizes a "Graphics Address Remapping Table" ("GART") which may reside in a physical memory of the computer system, such as system random access memory, and may be controlled by the core logic chipset's software driver(s). The function of the GART is to re-map virtual addresses referenced by the AGP device to the physical addresses of the graphics information located in the computer system physical memory (see FIG. 8). Each entry of the GART describes a first byte address location for a page of physical memory. The page of physical memory may be 4,096 bytes (4 KB) in size. A GART entry comprises a memory address translation pointer and software controllable feature flags (see the AGP Specification). These feature flags may be used to customize the associated page of physical memory. API software and miniport drivers may write to and/or read from these feature flags.

For illustrative purposes, preferred embodiments of the present invention are described hereinafter for computer systems utilizing the Intel x86 microprocessor architecture and certain terms and references will be specific to those processor platforms. AGP and PCI are interface standards are, however, hardware independent and may be utilized with any host computer designed for these interface standards. It will be appreciated by those skilled in the art of computer systems that the present invention may be adapted and applied to any computer platform utilizing the AGP and PCI interface standards.

The PCI specifications referenced above are readily available and are hereby incorporated by reference. The AGP Specification entitled "Accelerated Graphics Port Interface Specification, Revision 1.0," dated Jul. 31, 1996, as referenced above, is readily available from Intel Corporation, and is hereby incorporated by reference. Further definition and enhancement of the AGP Specification is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned co-pending U.S. patent application Ser. No. 08/853,289; filed May 9, 1997, entitled "Dual Purpose Apparatus, Method and System for Accelerated Graphics Port and Peripheral Component Interconnect" by Ronald T. Horan and Sompong Olarig, and which is hereby incorporated by reference.

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1, a schematic block diagram of a computer system illustrates the basic architecture of prior art systems. A computer system is generally indicated by the numeral 100 and comprises a central processing unit(s) ("CPU") 102, core logic chipset 104, system random access memory ("RAM") 106, a video graphics controller 110, a local frame buffer 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU(s) 102 is connected to the core logic chipset 104 through a host bus 103. The system RAM 106 is connected to the core logic chipset 104 through a memory bus 105. The video graphics controller(s) 110 is connected to the core logic chipset 104 through a primary PCI bus 109. The PCI/SCSI bus adapter 114, PCI/EISA/ISA bridge 116, and PCI/IDE controller 118 are connected to the core logic chipset 104 through the primary PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113.

Figure 2:
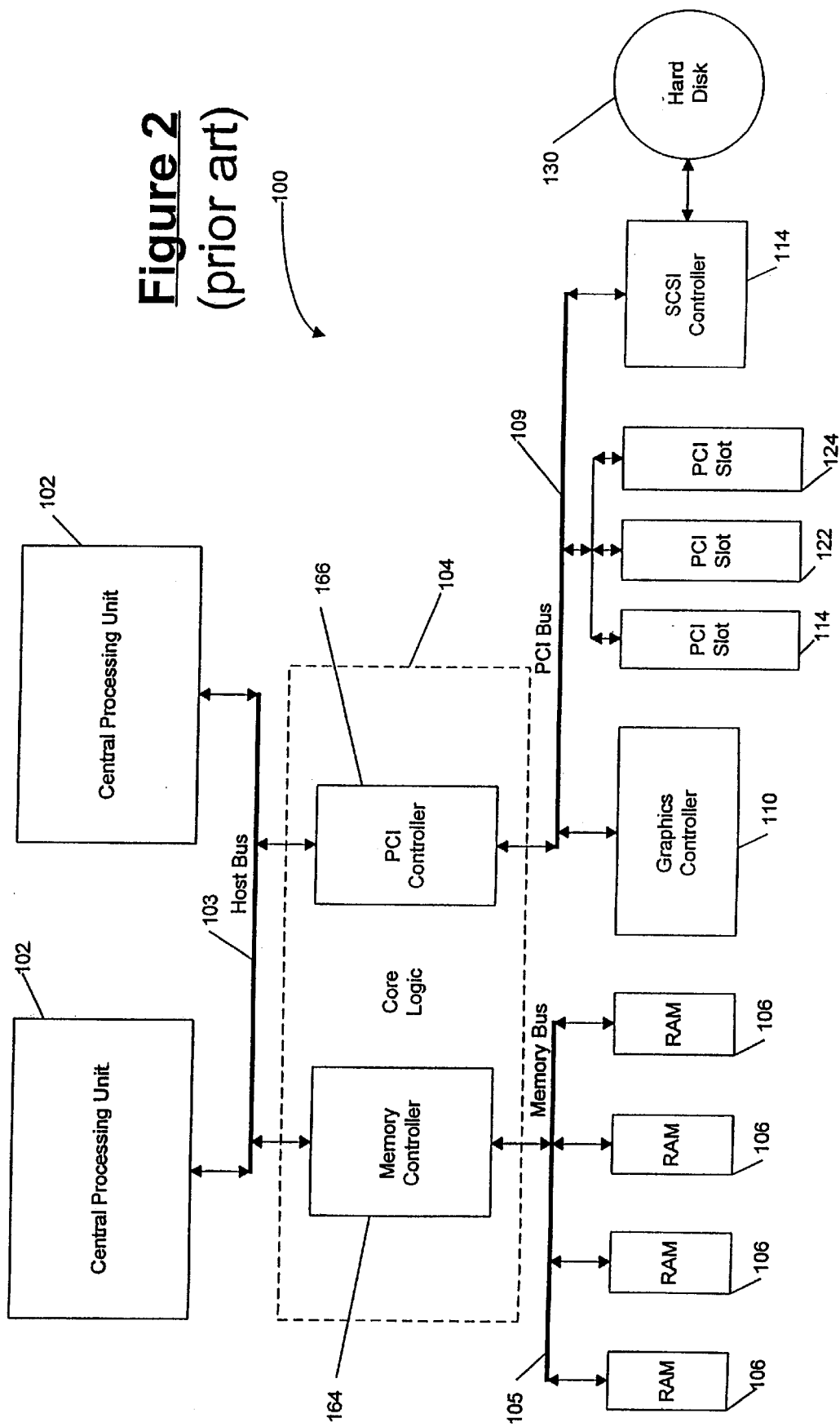
FIG. 2 is a schematic block diagram of a computer system according to the present invention.

FIG. 2 is a simplified schematic block diagram of the computer system of FIG. 1. Identical components are numbered identically between the two figures. FIG. 2, however, shows more details of the core logic unit 104. Specifically, the PCI controller 166 and the Memory controller 164, and their connections to the memory bus 105 and the PCI bus 109, respectively, are illustrated.

Traditionally, PC systems have contained only one root I/O bridge and one memory controller (see FIG. 2). In certain high-bandwidth applications found in workstations and servers, these systems can bottleneck at either the PCI controller 166 or the memory controller 164. To avoid these limitations, system designers are creating highly parallel architectures incorporating multiple memory controllers and multiple core logic units.

Figure 3:
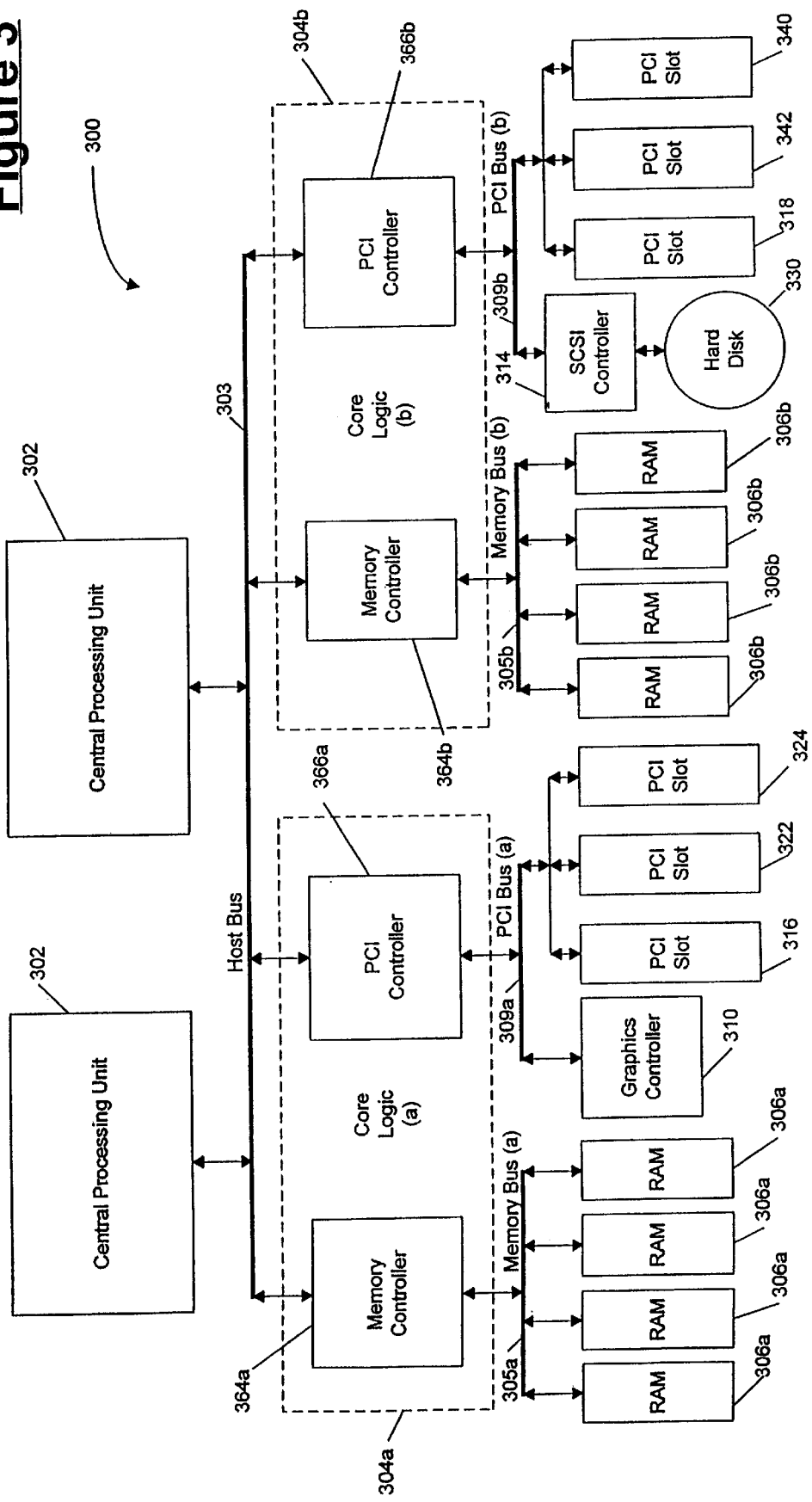
FIG. 3 is a schematic functional block diagram of an embodiment of the present invention according to the computer system of FIG. 2.

FIG. 3 shows a computer system 300 having two core logic units 304a and 304b. As shown in FIG. 3, system RAM 306a is connected to a memory bus 305a, which, in turn, is connected to the first memory controller 364a of the first core logic unit 304a. PCI slots 316, 322, and 324 are connected as a unit to the first PCI bus 309a. A graphics controller 310 is also connected to the PCI bus 309a. The PCI bus 309a is connected to the PCI controller 366a of the first core logic unit 304a. The second core logic unit 304b contains its own bank of system memory 306b which, as with the system memory 306a, contributes to the overall memory resources of the computer system 300. As with the first core logic unit, the system memory 306b of the second core logic unit 304b is connected to a second memory bus 305b which, in turn, is connected to the second memory controller 364b. Similarly, the PCI slots 318, 342 and 340 are connected to the second PCI bus 309b. A hard disk drive 330 is also connected to the second PCI bus 309b via SCSI controller 314. A second PCI controller 366b links the second PCI bus 309b to the host bus 303. Both of the core logic units 304a and 304b are connected to the host bus 303 as shown in FIG. 3. It is through the host bus 303 that data in memory from the second bank of system RAM 306b is transferred to, for example, graphics controller 310 of the first core logic unit 304a. Although these enhanced memory and I/O architectures do not directly affect operating systems, specifically memory managers, one class of devices is affected—AGP.

Figure 4:
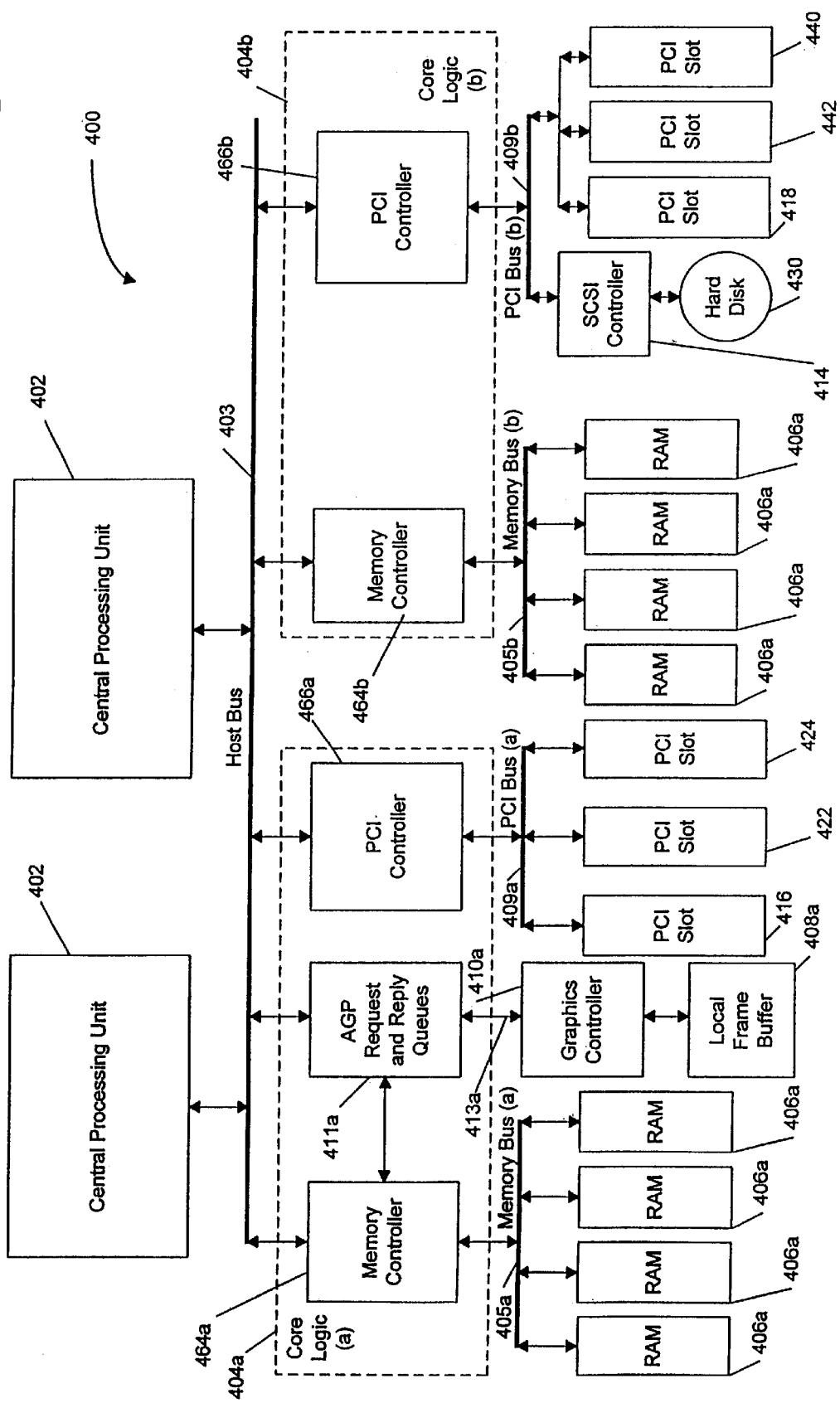
FIG. 4 is a flowchart of the method of to build the MBAT of the present invention.

FIG. 4 shows the preferred embodiment of a computer system 400 of the present invention. As FIG. 4 shows, the computer system 400 has two core logic units 404a and 404b in a highly parallel system architecture (although more CPUs can be added). As shown in FIG. 4, system RAM 406a is connected to a memory bus 405a, which, in turn, is connected to the first memory controller 464a of the first core logic unit 404a. PCI slots 416, 422, and 424 are connected as a unit to the first PCI bus 409a. A graphics controller 410 is connected to the AGP bus 413, which, in turn, is connected to the AGP request and reply queues 411 that link the AGP bus 413 to the host bus 403 and the first memory controller 464a. The PCI bus 409a is connected to the PCI controller 466a of the first core logic unit 404a. The second core logic unit 404b contains its own bank of system memory 406b which, as with the system memory 406a, contributes to the overall memory resources of the computer system 400. As with the first core logic unit, the system memory 406b of the second core logic unit 404b is connected to a second memory bus 405b which, in turn, is connected to the second memory controller 464b. Similarly, the PCI slots 418, 442 and 440 are connected to the second PCI bus 409b. A hard disk drive 430 is also connected to the second PCI bus 409b via SCSI controller 414. A second PCI controller 466b links the second PCI bus 409b to the host bus 403. Both of the core logic units 404a and 404b are connected to the host bus 403 as shown in FIG. 4. It is through the host bus 403 that data in memory from the second bank of system RAM 406b is transferred to, for example, graphics controller 410 of the first core logic unit 404a. According to the highly parallel system architecture, system resources share all of the system memory 406a and 406b, regardless of the location of the specific device within the computer system 400. When the operating system allocates memory, it does so as viewing all of the system memory as one contiguous unit.

AGP Specification

The Intel AGP Specification entitled "Preliminary Draft of Accelerated Graphics Port Interface, Preliminary Draft Specification Revision 2.0," dated Dec. 10, 1997, incorporated by reference hereinabove, provides signal, protocol, electrical, and mechanical specifications for the AGP bus. However, further design must be implemented before a fully functional computer system with AGP capabilities is realized. The following disclosure defines the implementation specific parts of an AGP interface according to the present invention. The following disclosure includes the GART and related technologies so that one of ordinary skill in the art may practice the present invention without undue experimentation when used with the aforementioned Intel AGP Specification incorporated by reference herein.

Moving textures and other information required by the graphics controller, such as command lists, out of the local frame buffer into system memory creates a problem: the presently implemented prior art computer system architecture, illustrated in FIG. 1, cannot support the bandwidth requirements of tomorrow's 3-D graphics enhanced applications. The standard PCI bus 109 (33 MHz, 32 bit) bandwidth is 132 MB/s peak and 50 MB/s typical. Microsoft Corporation estimates that future graphics applications will require in excess of 200 MB/s. This means that the PCI bus 109 in the computer system architecture illustrated in FIG.

1 will likely starve the graphics controller 110 as well as other PCI devices (122, 124, 114, 116 and 118) also trying to access the PCI bus 109.

AGP Architecture

The AGP interface specification uses the 66 MHz PCI (PCI Local Bus Specification) specification as an operational baseline, and provides four significant performance extensions or enhancements to the PCI specification which are intended to optimize the A.G.P. for high performance 3D graphics applications. These A.G.P. extensions are not described in, or required by, the PCI Local Bus, Specification.

These extensions are:
1. Deeply pipelined memory read and write operations, fully hiding memory access latency.
2. Demultiplexing of address and data on the bus, allowing almost 100% bus efficiency.
3. New AC timing in the 3.3 V electrical specification that provides for one or two data transfers per 66-MHz clock cycle, allowing for real data throughput in excess of 500 MB/s.
4. A new low voltage electrical specification that allows four data transfers per 66-MHz clock cycle, providing real data throughput of up to I GB/s.

These enhancements are realized through the use of "side-band" signals. The PCI specification has not been modified in any way, and the A.G.P. interface specification has specifically avoided the use of any of the "reserved" fields, encodings, pins, etc., in the PCI specification. The intent is to utilize the PCI design base while providing a range of graphics-oriented performance enhancements with varying complexity/performance tradeoffs available to the component provider.

AGP neither replaces nor diminishes the necessity of PCI in the system. This high-speed port (AGP) is physically, logically, and electrically independent of the PCI bus. It is an additional connection point in the system, as shown in FIG. 4. It is intended for the exclusive use of visual display devices with all other I/O devices remaining on the PCI bus. The add-in slot defined for AGP uses a new connector body (for electrical signaling reasons) which is not compatible with the PCI connector; PCI and AGP boards are not mechanically interchangeable.

Two Usage Models: "Execute" and "DMA"

There are two primary AGP usage models for 3D rendering that have to do with how data are partitioned and accessed, and the resultant interface data flow characteristics. In the "DMA" model, the primary graphics memory is the local memory associated with the accelerator, referred to as "local frame buffer." 3D structures are stored in system memory, but are not used (or "executed") directly from this memory; rather they are copied to primary (local) memory (the "DMA" operation) to which the rendering engine's address generator makes its references. This implies that the traffic on the AGP tends to be long, sequential transfers, serving the purpose of bulk data transport from system memory to primary graphics (local) memory. This sort of access model is amenable to a linked list of physical addresses provided by software (similar to operation of a disk or network I/O device), and is generally not sensitive to a non-contiguous view of the memory space.

In the "execute" model, the accelerator uses both the local memory and the system memory as primary graphics memory. From the accelerator's perspective, the two memory systems are logically equivalent; any data structure may be allocated in either memory, with performance optimization as the only criteria for selection. In general, structures in system memory space are not copied into the local memory prior to use by the accelerator, but are "executed" in place. This implies that the traffic on the AGP tends to be short, random accesses, which are not amenable to an access model based on software resolved lists of physical addresses. Because the accelerator generates direct references into system memory, a contiguous view of that space is essential. However, because system memory is dynamically allocated in random 4K pages, it is necessary in the "execute" model to provide an address mapping mechanism that maps random 4K pages into a single contiguous, physical address space.

The AGP supports both the "DMA" and "execute" models. However, since a primary motivation of the A.G.P. is to reduce growth pressure on local memory, the "execute" model is the design center. Consistent with that emphasis, this interface specification requires a physical-to-physical address re-mapping mechanism which insures the graphics accelerator (an AGP master) will have a contiguous view of graphics data structures dynamically allocated in system memory.

This address re-mapping applies only to a single, programmable range of the system physical address space, as shown in FIG. 8. The 32-bit physical address space 806 shown is common to all system agents. Addresses falling in the GART range 804 are remapped (812) to non-contiguous pages of physical system memory 808. All addresses not in this range are passed through without modification. From the processor's point of view, this means that requests are mapped directly to main system memory 808 or to device specific ranges, such as the graphics local frame buffer memory 802 shown in FIG. 8. From the AGP master's point of view, this means the request is only mapped to system memory 808. Note that the core logic may optionally trap (not pass) requests out of the GART range 804 and report an error. If the mode of reporting the error is implemented, the core logic is required to default to the mode of not reporting an error after reset. How software enables the core logic to report an access out of the GART range as an error (if supported) is implementation specific.

Remapping is accomplished via a memory-based table called the Graphics Address Remapping Table (GART) and used ("walked") by the core logic to perform the re-mapping. In order to avoid compatibility issues and allow future implementation flexibility, this mechanism is specified at a software (API) level. In other words, the actual GART format is not specified; rather a HAL or miniport driver that must be provided with the core logic abstracts it to the API. While this API does not constrain the future partitioning of re-mapping hardware, the re-mapping function will initially be implemented in the chipset or core logic. Note: this re-mapping function should not be confused in any way with the system address translation table mechanism. While some of the concepts are similar, these are completely separate mechanisms, which operate independently, under control of the operating system.

Understanding the necessity for the Graphics Address Remapping Table ("GART") requires a full understanding of the AGP addressing scheme. Such an understanding can be had from U.S. patent application Ser. No. 08/925,772 referenced above.

Dual Memory Controllers

Dual memory controllers process memory requests in parallel, significantly increasing overall memory bandwidth. Other servers using the x86 architecture offer memory bandwidth of either 267 MB/second or 533 MB/second depending on the memory controller chipset used. In contrast, HPSA includes two memory controllers, each with a bandwidth of 533 MB/second. Therefore, total memory bandwidth increases to 1.07 GB/second—two to four times that of other systems.

Dual memory controllers process memory requests in parallel, significantly increasing overall memory bandwidth. Other servers using the x86 architecture offer memory bandwidth of either 267 MB/second or 533 MB/second depending on the memory controller chipset used. The new servers with HPSA include two memory controllers, each with a bandwidth of 533 MB/second. Therefore, total memory bandwidth increases to 1.07 GB/second; two to four times that of prior art systems.

Dual peer-PCI buses provide greater I/O bandwidth, the ability to balance system resources and greater system I/O integration and expandability. A single PCI bus provides I/O bandwidth of 133 MB/second, which must be shared by many key peripherals such as the hard drive and NIC. With dual-peer PCI buses, each bus can provide peak bandwidth in parallel with the other controller, allowing an aggregate I/O bandwidth of 267 MB/second. This implementation provides twice the bandwidth of single bus architectures.

Another benefit of dual-peer PCI buses is the ability to balance system resources across the two buses to gain improved performance. For example, the embedded Wide-Ultra SCSI controller and PCI-based network interface controller can be associated with separate buses. This means that these two highly used peripherals do not have to compete for access to the same PCI bus, which again improves performance.

Finally, dual-peer PCI buses also allow for greater system I/O integration and expandability by supporting up to 12 PCI devices which is twice the number supported on single bus implementations. Dual peer PCI buses allow the new present invention to deliver more PCI-based I/O expansion slots while also integrating other PCI components, such as the SCSI, on the system board.

With dual memory controllers and dual peer-PCI buses, the present invention delivers optimized multiprocessing support. Both the Intel Pentium II and Pentium Pro processors provide enhanced multiprocessor support by enabling the multiple processors to share the CPU bus. However, most multiprocessing implementations using the X86 architecture take advantage of this support by simply adding an additional processor to an already existing single processor design. However, HPSA can be used to enhance memory and I/O bandwidth as well. Multiprocessor systems designed without the HPSA will encounter a bottleneck as the multiple processors try to access the other system resources, such as memory and I/O subsystems that have not been enhanced to accommodate the additional data traffic. The HPSA reduces these bottlenecks by enhancing the memory and I/O subsystems with dual memory controllers and dual peer-PCI buses, to accommodate the increased data traffic from multiple CPUs.

Adding AGP to HPSA

Adding AGP to a HPSA computer system creates several problems. First, because memory is located on both memory controllers, it is possible that the AGP or the GART physical system memory can be allocated to memory residing on the non-AGP memory controller. While this information can be passed between controllers, such processing degrades system performance because it consumes both time and valuable host bus bandwidth. It is desirable, therefore, for the operating system to allocate AGP and GART memory to physical system memory that is connected to the same core logic unit as the AGP device in order to reduce the need to contact memory across the host bus. Second, multiple core logic architectures equipped with AGP can quickly lead to computer systems with multiple AGP busses—exacerbating the problem.

HPSA has many advantages. One of the most important advantages is its ability to utilize all of the system memory 406 (see FIG. 4) on all of the various core logic chipsets 404 for any device, dynamically, at runtime. Consequently, memory allocated for a first central processing unit can reside both on the first set of RAM 406a as well as on the second set of system RAM 406b. While this "pooling" of resource can yield tremendous benefits, it can also increase demands on the host bus 403, through which all data is transferred between the CPUs 402 and core logic chipsets 404. This is the problem solved by the present invention. According to the present invention, memory allocated for AGP 410, for example, is first allocated from system RAM 406a thereby avoiding use of the host bus 403 resources and increasing overall system performance.

To support multiple core logic architectures equipped with AGP, the operating system requires specific information not readily available; such as how many core logic units are present, how much memory resides on each core logic, how is memory interleaved between core logic units, etc. The present invention utilizes one of the advanced configuration power interface (ACPI) control methods that pass along crucial information to the operating system. ACPI is a system regulatory scheme that governs the interfaces between the operating system software, the hardware, and the BIOS software. ACPI also defines the semantics of those interfaces. Intel Corporation, Microsoft Corporation, and Toshiba developed the ACPI specification. The Revision 1.0 ACPI specification was released on Dec. 22, 1996 and is readily available from Microsoft Corporation of Redmond Wash. and is incorporated herein by reference for all purposes. Additional information can be found in the "Draft ACPI Driver Interface Design Notes and Reference" which is also available from the Microsoft Corporation of Redmond, Wash. and this document too is incorporated herein by reference for all purposes.

By employing the ACPI control methodology, a computer system with one or more AGP-equipped core logic chipsets can pass to the operating system (OS) the information required to solve the above-mentioned problems in the prior art and still retain the advantages afforded by HPSA. Specifically, a new ACPI table is developed in the present invention to pass pertinent information to the operating system. The table is called the Memory Bank Address Table (MBAT). Special system BIOS ACPI Source Language (ASL) builds the MBAT dynamically at runtime. Accessed via an ACPI control method, the AGP driver and GART miniport driver use the MBAT information before making calls to the operating system's memory manager. The drivers pass ranges, derived from the MBAT, to the memory manager to, for example, the Windows NT 5.0 operating system routine "MmAllocatePagesForMdl( )." The MmAllocatePagesForMdl( ) routine allows drivers to allocate pages of memory that lie within driver-specified physical address ranges. The memory manager attempts to allocate memory within the specified range. If memory cannot be allocated within the required range, the drivers allocate memory from outside the range as a fallback.

The Memory Bank Address Table (MBAT) contains all of the information needed by the AGP driver to build a suitable memory descriptor list (MDL) for allocating AGP/GART resources. The MBAT is a predefined structure, format, or record that contains several elements or fields. In the preferred embodiment of the present invention, these elements include a Table Version, the AGP Bus Number, a Valid Entry Bitmap, and a Decode Range array. The Table Version field allows for future changes to the format or the structure of the MBAT. Typically, the Table Version contains an integer value that is incremented by one for each new version. The first Table Version is assigned the number 1.

In systems that support multiple AGP devices, the Bus Number field provides a means to distinguish between AGP devices if more than one AGP device is present. The value in the Bus Number field is typically the number of the bus behind a PCI-to-PCI bridge device. If the OS is using virtual bus numbers, the AGP driver or GART miniport driver will need to convert the bus number returned by the OS to a virtual equivalent.

The MBAT has a fixed number of physical address ranges contained in the Decode Range array. The Valid Entry Bitmap is used to indicate the entries that are filled with actual information. Each bit has a one-to-one correspondence with an element in the Decode Range array.

The physical address ranges are contained within the Decode Range array. Only entries with enabled Valid Entry Bitmap bits contain information. In the preferred embodiment of the present invention, the Decode Range array element has two values, a Begin value and an End value. The Begin value is the starting physical address of an address range. An address can being anywhere in a 64-bit address space as provided by the system architecture. The End value is the physical address that defines an inclusive range from the Begin address, and, therefore defines the physical address range. Obviously, the End address must come after the Begin address in the physical memory region.

The MBAT is built before the need for memory allocation arises. In the preferred embodiment of the present invention, the MBAT is built dynamically by the system BIOS as needed. Dynamic generation of the MBAT as needed allows for reconfiguration of the computer system without rebooting. This reconfiguration of the computer system while the system is running is often called "hot-swapping" or "hot-plugging." However, in an alternate embodiment where the system configuration never changes, the MBAT may be built once at system startup and simply stored until needed, thereby speeding up somewhat those system memory allocation calls that require the MBAT.

If the system BIOS does not support the building of the MBAT, the GART miniport driver or the AGP driver can build the MBAT. The structure of the MBAT contains the ranges of memory local to the AGP device depending upon the configuration of the computer system found during startup (POST). The actual form of the MBAT is chipset specific because of the use of certain registers. In any case, by the time that the operating system has booted, the MBAT will have been created and the operating system will know of the location of the MBAT. The location of the MBAT can be in system memory, in non-volatile RAM (NVRAM), on a hard disk drive, a network drive that is connected to the computer system via a network interface card, or on any volatile or non-volatile memory that can be connected to the computer system which can contain the contents of the MBAT. In the preferred embodiment of the present invention, however, the MBAT will be contained within the system memory.

The method of building of the MBAT is illustrated in FIG. 5. The method is started in step 502. First, the machine is turned on (or is reset), step 504. Next, as is typically of most computer systems, the basic input-output system (BIOS) POST is activated. At this point, the BIOS POST program has absolute control over everything in the computer system. Initially, no memory is allocated for any use, except for the first 1 KB that reserved for the interrupt vector table (IVT) and the top of the first megabyte with a ROM containing suitable boot code. During the POST process, some IVT entries are filled in with pointers to interrupt service routines (ISRs) located in the motherboard BIOS. Also, some data is placed in the BIOS area, which is, typically, in the region immediately following the IVT. It is at this point when the MBAT is built, step 508 and placed in NVRAM. When the BIOS POST is completed, it loads the operating system, specifically loading the boot sector program from the boot disk. The boot sector program then loads the actual operating system. Once the operating system is booted, it recognizes the MBAT, step 510, and the process is completed, step 512.

Accessing the MBAT is accomplished through an ACPI control method owned by the AGP device. The AGP driver attempts to invoke the BANK method through the ACPI interface. The value that is returned from the method call is a buffer filled with the MBAT. In the preferred embodiment of the present invention, the size of the buffer is no less than 131 bytes.

A typical MBAT is shown in Table 1. Each number on the right indicates the byte offset to the table needed by the control method to place data in the appropriate field positions. The ACPI source language (ASL) implementation provided below uses the offset values to create field objects.

TABLE 1

| | | | | | | |
|---|---|---|---|---|---|---|
| 0x01 | | // | 0 | | | |
| 0x01 | | // | 1 | | | |
| 0x05 | | // | 2 | | | |
| 0x0000000000000000 | 0x0000000007FFFFFF | // | 3 | 7 | 11 | 15 |
| 0x0000000000000000 | 0x0000000000000000 | // | 19 | 23 | 27 | 31 |
| 0x000000000C000000 | 0x000000000FFFFFFF | // | 35 | 39 | 43 | 47 |
| 0x0000000000000000 | 0x0000000000000000 | // | 51 | 55 | 59 | 63 |
| 0x0000000000000000 | 0x0000000000000000 | // | 67 | 71 | 75 | 79 |
| 0x0000000000000000 | 0x0000000000000000 | // | 83 | 87 | 91 | 95 |
| 0x0000000000000000 | 0x0000000000000000 | // | 99 | 103 | 107 | 111 |
| 0x0000000000000000 | 0x0000000000000000 | // | 115 | 119 | 123 | 127 |

In the preferred embodiment, the MBAT (as shown in Table 1) contains eleven lines. The first line contains the Table Version field. The second line contains the Bus Number field. The third line contains the Valid Entry Bitmap Field. Finally, the next eight lines contain the Decode Ranges, with the Begin field on the left and the End field adjacent to the right of the Begin field. The various offset numbers are shown on the right of each line, after the "//" characters.

The ASL builds the MBAT using dynamic information from the memory controller. The memory decode rows are read directly from the memory controller and translated into the MBAT buffer. The AGP parent PCI-to-PCI bridge is queried to get the bus number dynamically. If the OS is using virtual bus numbers, the AGP driver will need to convert the Bus Number to a virtual equivalent.

The AGP driver and GART miniport driver must invoke the ACPI control method associated with the AGP device to retrieve physical memory information. This is accomplished by issuing, for example, IRP_MJ_PNP and IRP_MN_QUERY_INTERFACE calls to the AGP's physical device object (PDO) to get the ACPI direct call interface. Although the interface is not necessarily needed, a successful query indicates that an ACPI object is associated with the device driver object. Otherwise, there is no reason to attempt to invoke the BANK control method and the AGP driver should resume normal handling for GART allocations. The PDO is an ideal vehicle for this activity because the PDO is constructed for the express purpose of allowing the I/O manager of the operating system and the device drivers to know that status of an I/O device at all times. Device objects make instant status checking possible by keeping information about a device's characteristics and state. There is one device object for each virtual, logical, and physical device on the computer system. Consequently, a PDO for the AGP device will be constructed and available as a matter of course.

The AGP driver takes the following specific steps to accomplish the task of retrieving physical memory information. First, a reference variable is loaded with the attached device reference (the AGP PDO). Second, an I/O request packet (IRP) is allocated for subsequent use. Third, the query interface (QUERY_INTERFACE method in Windows NT) is used to obtain the address of the direct-call ACPI interfaces. Fourth, the IRP retrieves the ACPI interface. Fifth, the bank control method (e.g., CM_BANK_METHOD in Windows NT) is invoked to retrieve the MBAT that is needed to build a set of memory descriptor lists (MDL) using the ICTRL_ASYNC_EVAL_METHOD and passing a buffer large enough to hold the MBAT. It is important to note that the memory manager of new operating systems may now support the function MmAllocatePagesForMdl( ) that was designed for use by AGP drivers to create MDLs that cover specific bands of physical memory. This support is necessary on systems with multiple memory controllers (such as HPSA). However, the current implementation of MmAllocatePagesForMdl( ) assumes that all of the memory bands are of the same width. The equal-width memory band scenario exists only if the memory banks are populated with identically sized dual inline memory modules (DIMMs). Flexible memory architectures allow variable sized DIMMs and, therefore, renders the banding technique supported by MmAllocatePagesForMdl( ) useless. In that situation, multiple calls must be made to create MDLs that describe the memory bands and those (multiple) MDLs must be combined to form a single MDL.

The actual memory allocation scheme depends upon how the driver intends to use the memory so allocated. In this instance, the driver need only perform the following steps for the GART memory. It will be understood by those skilled in the art that the exact procedural steps will depend upon the operating system involved and the procedures and methods available in that operating system. In the preferred embodiment as described herein, the Microsoft Windows NT 5.0 operating system is used and the following procedure depends upon that operating system. Once the driver obtains the MBAT, the driver examines the ValidEntryBitmap field to determine which entries in the DecodeRange[ ] array is valid. Next, for each valid entry, a call is made to MmAllocatePagesForMdl( ) passing a skip value of zero. A combined MDL must be created before attempting to lock the pages. The pages described by the MDL are then locked into memory using MmProbeAndLockPages( ) method. Finally, the pages are mapped into the virtual address space using MmMapLockedPagesSpecifyCache( ) method. The driver must manage multiple MDLs, tiling the mapped ranges to create the contiguous virtual address space needed by the AGP device.

The general method of memory allocation operation is illustrated in FIG. 6. The process is started in step 602. First, in step 604, a check is made to determine if a copy of the MBAT is already available to the AGP driver (or GART miniport driver) locally. If so, execution skips to step 612. Otherwise, execution continues to step 606 where the driver calls the ACPI bank method of the memory manager of the operating system. Next, in step 608, the memory manager returns a copy of the MBAT to the requesting driver. Optionally, the copy of the MBAT can be stored locally to the requesting driver for quick reference in subsequent memory allocations procedures, step 610. In step 612, the AGP driver (or GART miniport driver) references the MBAT to determine if any ranges of local memory (i.e., memory connected to the same core logic chipset as the AGP device) is available. The local memory so identified, as much as needed, and the ranges of those memory locations are used to generate parameters for the call to the memory manager for the allocation of new memory (for example, the MmAllocatePagesForMdl( ) in Windows NT). If the call is successful, step 616, then the AGP device can use the newly allocated local memory in the normal fashion. If the call was not successful, the AGP driver (or GART miniport driver) can make the same call to the memory manager without requesting specific ranges (i.e., allocate memory from any available resources within the computer system). Finally, the process ends in step 618.

Figure 7:
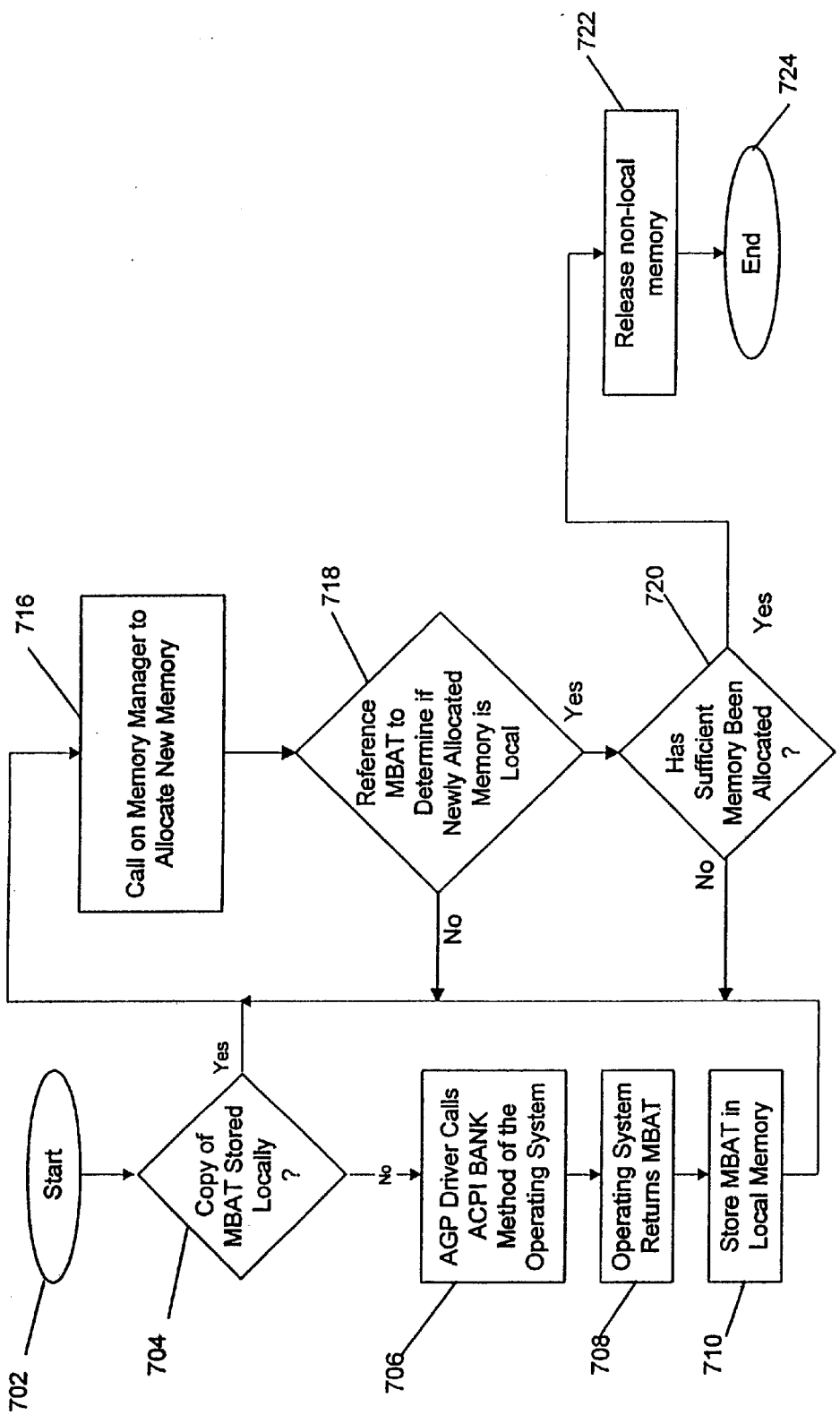
FIG. 7 is a flowchart of the allocation of memory according to an alternate embodiment of the present invention.

A special situation arises for those operating systems that do not accommodate specific ranges in the memory allocation request. In those cases, the method described above can be modified to suit the situation. Such a method is illustrated in FIG. 7. First, the method is started, step 702. Next, in step 704, the AGP driver or GART miniport driver checks to see if it has a copy of the MBAT. If so, execution skips to step 716. Otherwise, execution continues to step 706, where the AGP driver (or GART miniport driver) invokes the ACPI bank method call to the operating system. The operating system returns the MBAT, step 708, and the requesting driver stores the MBAT locally, step 710. In step 716, the memory manager of the operating system is called, requesting that new memory be allocated. It is at step 718 where this alternate embodiment differs from the preferred embodiment. In step 718, the newly allocated memory range that was returned by the memory manager of the OS is compared to the MBAT. The comparison of step 718 is used to determine if the newly allocated memory is physically located within the same core logic chipset as the AGP device. In contrast, in the preferred embodiment, if the pages cannot be allocated within the specified range (i.e., local memory), then the method call returns an error and the preferred method then allocates memory anywhere, without restriction, as a fall back (see step 616 of FIG. 6). In this alternate embodiment, if the newly allocated memory is local (i.e., step 718 is positive), then step 720 is executed. In step 720, a check is made to determine if sufficient memory has been allocated. If not, execution returns back to step 716 so that more memory can be allocated. Otherwise, the non-local memory is released (while the local memory is retained) in step 722 and execution ends in step 722. Once the memory is allocated, the AGP driver or GART miniport driver utilizes the memory in the normal manner.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those of ordinary skill in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system, said computer system comprising:
   a central processing unit connected to a host bus;
   a system memory having an addressable memory space comprising a plurality of bytes of storage, wherein each of said plurality of bytes of storage has a unique address;
   a first memory controller connected to said host bus, said first memory controller connected to a first portion of said system memory;
   a second memory controller connected to said host bus, said second memory controller connected to a second portion of said system memory;
   an input-output bus connecting an input-output device to said first memory controller and to said host bus, said input-output device being controlled by a driver; and
   a memory bank allocation table, said memory bank allocation table capable of containing said unique addresses of said first portion of said system memory;
   wherein said driver references said memory bank allocation table in order to determine a range of said system memory connected to said first memory controller so that said driver may allocate some of said first portion of said system memory.

2. A computer system as in claim 1, wherein said memory bank address table contains a version number.

3. A computer system as in claim 1, wherein said memory bank address table contains a bus number.

4. A computer system as in claim 1, wherein said memory bank address table contains a valid entry bitmap.

5. A computer system as in claim 1, wherein said memory bank address table contains an array of decode ranges.

6. A computer system as in claim 5, wherein said decode ranges of said memory bank address table each contain a begin field.

7. A computer system as in claim 5, wherein said decode ranges of said memory bank address table each contain an end field.

8. A computer system as in claim 1, wherein said memory bank address table is created by BIOS.

9. A computer system as in claim 1, wherein said memory bank address table is created by a GART miniport driver.

10. A computer system as in claim 1, wherein said memory bank address table is created by an AGP driver.

11. A computer system as in claim 1, wherein said driver is a GART miniport driver.

12. A computer system as in claim 1, wherein said driver is an AGP driver.

13. A method of allocating local memory for an AGP device, said method comprising the steps of:
    (a) providing an operating system;
    (b) providing a driver;
    (c) calling an ACPI method of said operating system with said driver;
    (d) retrieving a memory bank address table from said operating system;
    (e) reading said memory bank address table with said driver in order to determine ranges of system memory local to said AGP device; and
    (f) allocating system memory local to said AGP device based upon said ranges determined in said step (e).

14. A method as in claim 13 wherein said driver is an AGP driver.

15. A method as in claim 13 wherein said driver is a GART miniport driver.

16. A method of allocating local memory for an AGP device, said method comprising the steps of:
    (a) providing an operating system having a memory manager;
    (b) providing a driver;
    (c) calling an ACPI method of said operating system with said driver;
    (d) retrieving a memory bank address table from said operating system;
    (e) calling said memory manager to allocate a range of system memory for said AGP device;
    (f) comparing said range of system memory allocated in said step (e) with said memory bank address table to determine if said range of system memory is physically located on a core logic chipset connected to said AGP device; and
    (g) repeating said steps (e) and (f) until sufficient system memory has been allocated.

17. A method as in claim 16, said method further comprising the step of:
    (h) releasing system memory determined not to be local to said AGP device in said step (f).

18. A method as in claim 16 wherein said driver is an AGP driver.

19. A method as in claim 16 wherein said driver is a GART miniport driver.

* * * * *